UNITED STATES PATENT OFFICE.

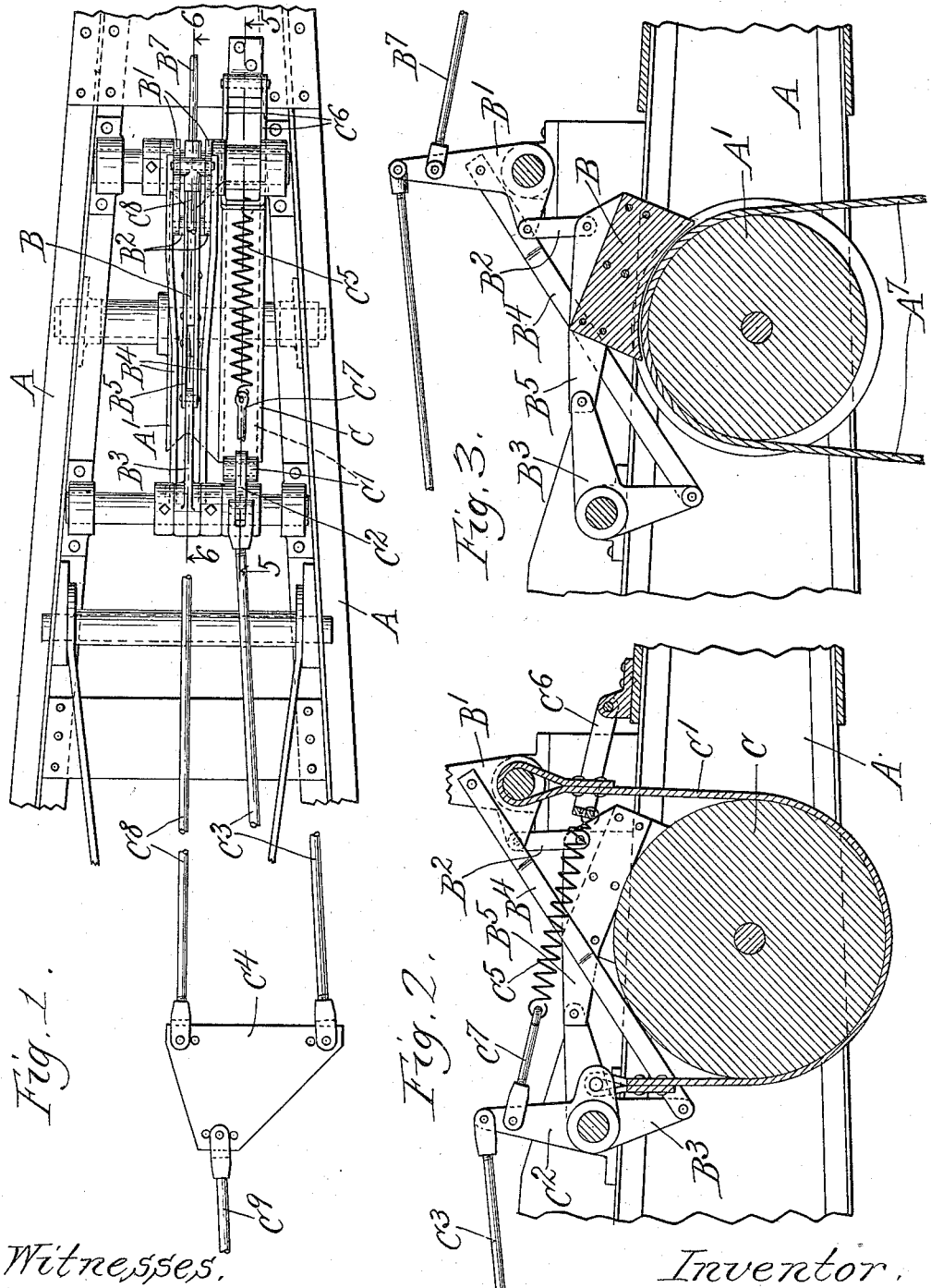

WALTER FERRIS, OF SOUTH MILWAUKEE, WISCONSIN, ASSIGNOR TO BUCYRUS COMPANY, OF SOUTH MILWAUKEE, WISCONSIN, A CORPORATION OF WISCONSIN.

CABLE-BRAKE FOR DRAG-LINE EXCAVATORS.

1,149,357.  Specification of Letters Patent.  Patented Aug. 10, 1915.

Application filed June 7, 1912. Serial No. 702,194.

*To all whom it may concern:*

Be it known that I, WALTER FERRIS, a citizen of the United States, residing at South Milwaukee, in the county of Milwaukee and State of Wisconsin, have invented a certain new and useful Improvement in Cable-Brakes for Drag-Line Excavators, of which the following is a specification.

My invention relates to improvements in cable brakes for drag line excavators and the like and is illustrated diagrammatically in the accompanying drawing, wherein—

Figure 1 a detail plan view of the dumping mechanism showing the preferred form; Fig. 2 a section along the line 5—5 of Fig. 1; Fig. 3 a section along the line 6—6 of Fig. 1.

Like parts are indicated by like letters throughout the several figures.

A is an excavator boom or other foundation base for my cable brake.

The brake shoe B is in opposition to the cable $A^7$ on the sheave $A^1$. The bell crank lever $B^1$ which is pivoted on the boom A is connected by means of the link $B^2$ with the outer end of the shoe B. The bell crank lever $B^3$ which is pivoted on the boom A is connected at one end by means of the link $B^4$ with the bell crank lever $B^1$ and at the other end is pivoted to the finger $B^5$ projecting rearwardly from the shoe B. The actuating link $C^8$ is controlled from the operating platform not shown to operate the bell crank lever $B^1$ and force the shoe against the cable to stop the rotation of the sheave and the passage of the cable thereabout. The link $B^7$ projects forwardly from the bell crank lever $B^1$ and is connected to the spring $C^5$ attached to the end of the boom A to normally hold the brake members out of the operative position.

The brake drum C is attached to the dumping sheave $A^1$, the brake band $C^1$ in opposition to the drum C is rigidly attached at one end to the boom A and is pivoted at the other end to the bell crank lever $C^2$, which is actuated by the controlling link $C^3$ which terminates in the equalizing plate $C^4$. The spring $C^5$ attached at one end to the yoke $C^6$ which in turn is pivoted to the bottom A and the other end to the link $C^7$ pivoted to the bell crank lever $C^2$, is adapted to hold the brake band normally in the inoperative position. The connecting link $C^8$ terminates in the adjusting equalizing yoke $C^4$ to which is attached the controlling rod $C^9$ leading to the operating platform not shown.

It will be evident that while I have shown in my drawings an operative device, still many changes may be made in the size, shape and arrangement of parts without departing materially from the spirit of my invention, and I wish therefore that my drawings may be regarded as in a sense diagrammatic.

In the preferred form of my device the arresting of the movement of the hoisting rope is done by means of the single brake shoe which is forced into contact with the dumping rope as it passes over the dumping sheave and jams the rope against it. There is thus a braking effect both on the sheave itself and on the rope, this effect being exerted by the single brake shoe, which by its direct contact and pressure against the rope arrests its travel, and which by forcing the rope against the sheave, also tends to arrest the travel of the sheave.

In my device there is added to the braking effect of this single cable engaging brake shoe, the braking effect of the brake band which grips the brake drum attached to the sheave and in order that these pressures may be equalized in the modified form, I use an equalizing plate whereby when the operator draws in on the braking connection, each of the brakes responds equally. In all cases, however, each separate brake is provided with the separate retracting spring which tends to hold the brake out of operative relation with the sheave.

I claim:

The combination with a hoisting cable and a sheave about which it travels, of a brake drum rigidly mounted on the sheave, a band brake in engagement with said drum, a brake block in opposition to the periphery of the sheave and the cable traveling thereabout, and means for simultaneously operating said brake block and brake band to cause them to grip respectively the cable and the drum, and equalizing means interposed between them.

WALTER FERRIS.

Witnesses:
  HARRY B. HAYDEN,
  GERTRUDE SERCOMB.

Copies of this patent may be obtained for five cents each, by addressing the "Commissioner of Patents, Washington, D. C."